United States Patent
Frei et al.

(10) Patent No.: US 9,928,241 B2
(45) Date of Patent: Mar. 27, 2018

(54) SYSTEMS AND METHODS FOR ANALYZING ELECTRONIC COMMUNICATIONS TO DYNAMICALLY IMPROVE EFFICIENCY AND VISUALIZATION OF COLLABORATIVE WORK ENVIRONMENTS

(71) Applicant: Smartsheet.com, Inc., Bellevue, WA (US)

(72) Inventors: Brent Frei, Bellevue, WA (US); Tony Jacobson, Kirkland, WA (US); Rajiv Arunkundram, Sammamish, WA (US); Erik Rucker, Seattle, WA (US); Thomas P. Maliska, Jr., Olympia, WA (US)

(73) Assignee: Smartsheet Inc., Bellevue, WA (US)

( * ) Notice: Subject to any disclaimer, the term of this patent is extended or adjusted under 35 U.S.C. 154(b) by 0 days.

(21) Appl. No.: 15/127,324

(22) PCT Filed: Mar. 18, 2015

(86) PCT No.: PCT/US2015/021329
§ 371 (c)(1),
(2) Date: Sep. 19, 2016

(87) PCT Pub. No.: WO2015/143083
PCT Pub. Date: Sep. 24, 2015

(65) Prior Publication Data
US 2017/0185592 A1 Jun. 29, 2017

Related U.S. Application Data

(60) Provisional application No. 61/955,119, filed on Mar. 18, 2014.

(51) Int. Cl.
*G06F 17/00* (2006.01)
*G06F 17/30* (2006.01)
(Continued)

(52) U.S. Cl.
CPC ........ *G06F 17/3002* (2013.01); *G06F 3/0482* (2013.01); *G06F 3/0483* (2013.01);
(Continued)

(58) Field of Classification Search
CPC .................................................. G06F 17/3089
See application file for complete search history.

(56) References Cited

U.S. PATENT DOCUMENTS 5,008,853 A * 4/1991 Bly ........................ G06Q 10/10
345/2.1
5,220,657 A * 6/1993 Bly ........................ G06Q 10/10
707/E17.007
(Continued)

FOREIGN PATENT DOCUMENTS

WO 2014/039898 * 3/2014
WO 2014/039898 A2 3/2014

OTHER PUBLICATIONS

International Search Report dated Sep. 3, 2015, issued in corresponding International Application No. PCT/US2015/021329, filed Mar. 18, 2015, 3 pages.

*Primary Examiner* — Laurie A Ries
(74) *Attorney, Agent, or Firm* — Christensen O'Connor Johnson Kindness PLLC

(57) ABSTRACT

Systems and methods for managing a collaborative environment are provided. A plurality of sheets is stored in a collaboration system. The collaboration system tracks user interactions with the plurality of sheets and generates a collaboration graph based on the interactions. The collaboration graph is analyzed to determine similarities between the sheets and/or the users. One or more visualizations are generated based on the collaboration graph and the determined similarities. In some embodiments, the collaboration
(Continued)

system is able to provide project management information even for dynamic workflows that are not explicitly defined.

18 Claims, 12 Drawing Sheets

(51) Int. Cl.

| | | |
|---|---|---|
| *G06Q 90/00* | (2006.01) | |
| *G06F 3/0482* | (2013.01) | |
| *G06F 3/0483* | (2013.01) | |
| *G06F 17/21* | (2006.01) | |
| *G06F 17/22* | (2006.01) | |
| *H04N 21/84* | (2011.01) | |

(52) U.S. Cl.
CPC ............ *G06F 17/218* (2013.01); *G06F 17/22* (2013.01); *G06F 17/3089* (2013.01); *G06Q 90/00* (2013.01); *H04N 21/84* (2013.01)

(56) References Cited

U.S. PATENT DOCUMENTS

| | | | |
|---|---|---|---|
| 6,931,532 B1* | 8/2005 | Davis | G06F 21/6209 380/273 |
| 6,959,268 B1* | 10/2005 | Myers, Jr. | G06Q 10/06 700/117 |
| 7,107,268 B1* | 9/2006 | Zawadzki | G06Q 10/06 |
| 7,107,518 B2* | 9/2006 | Ramaley | G06Q 10/10 715/235 |
| 7,765,166 B2* | 7/2010 | Beringer | G06Q 10/06313 705/319 |
| 9,436,927 B2* | 9/2016 | Saliba | G06Q 10/10 |
| 2002/0065628 A1* | 5/2002 | McMahan | B65H 43/00 702/179 |
| 2004/0122853 A1* | 6/2004 | Moore | G06Q 10/06 |
| 2005/0027585 A1* | 2/2005 | Wodtke | G06Q 10/06316 705/7.26 |
| 2007/0038494 A1* | 2/2007 | Kreitzberg | G06Q 10/10 358/1.9 |
| 2010/0073377 A1* | 3/2010 | Cai | G06T 13/80 345/440 |
| 2010/0306249 A1* | 12/2010 | Hill | G06F 17/30867 707/769 |
| 2012/0019535 A1* | 1/2012 | Miyashita | G06T 11/206 345/440 |
| 2012/0143849 A1* | 6/2012 | Wong | G06F 17/30383 707/722 |
| 2014/0074545 A1* | 3/2014 | Minder | G06Q 50/01 705/7.27 |
| 2014/0152665 A1* | 6/2014 | Lu | G06T 11/206 345/440 |
| 2014/0279832 A1* | 9/2014 | Vivalda | G06F 17/30592 707/602 |

\* cited by examiner

SYSTEMS AND METHODS FOR ANALYZING ELECTRONIC COMMUNICATIONS TO DYNAMICALLY IMPROVE EFFICIENCY AND VISUALIZATION OF COLLABORATIVE WORK ENVIRONMENTS

CROSS-REFERENCE(S) TO RELATED APPLICATION(S)

This application claims the benefit of Provisional Application No. 61/955,119, filed Mar. 18, 2014, the entire disclosure of which is hereby incorporated by reference for all purposes.

BACKGROUND

Management software tools (including project management, work collaboration, and work coordination software tools) permit users to collaborate on tasks and to track task status. Many management software tools identify and store assets such as documents, which are the objects of or used for the completion of tasks. Some management software tools also provide for the review tasks from an operations management point of view in order to efficiently assign, approve and route task steps. These tools further provide a means of managing the workflow to of an organization, including notifications, approvals, and achievement of milestones such as due dates, document completion, submissions, and so forth.

One typical type of management software tool is a structured project management tool such as Microsoft® Project® and its many competitors. Structured project management tools track key project steps using calendar, task lists, notifications, and workflows focused on item completion. Another typical type of management software tool is a team task management tool, such as Asana, which is configured to coordinate user communications and work assignments around specific tasks tracked by the tool. Yet another type of management software tool is a social collaboration tool which hosts threaded discussions around a topic or set of related topics. Document sharing and management tools are also used as management software tools. Document sharing and management tools capture documents from various sources in an enterprise (e.g., web form, fax, print, scan) and direct them to business workflows (insurance form processing, sales, etc.). Custom-purpose tools directed to specific organizations and tasks, of which there are myriad examples across business disciplines, are also used as management software tools. These custom-purpose tools are directed to particular tasks, including but not limited to insurance form processing, HR/recruiting process, sales channel communications, sales contact management, trade show planning, etc.

In working with management software tools, users often adopt additional tools which add complementary data to the task elements tracked by the management software tools. Examples, without limitation, include financial tools (such as budget creation and expense tracking), managerial tools (such as staff time allocations and tracking), human resource record management tools (such as training, level, job description) and training materials which document the proper workflow and instructions for tasks.

Much of this information uses intensive cross-referencing of data resources and communication between users to complete tasks. The application of standard reporting tools for graphical visualization of a user's tasks and relationships with others within a project (within an organization or external to an organization) create results which are difficult to interpret when rich data resources, often of multiple types, are incorporated in the analysis. It is also the case that the evolution of projects, and individual participation in them, is difficult to track, whether as a snapshot at a given point in time or in terms of participation over time.

To that end, a more dynamic, interactive tool to visualize an individual user's work and the other individuals, groups and organizations to which their work is connected is desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for managing online documents is provided. The system comprises a sheet data store, an interaction monitoring engine, an interaction data store, a sheet metadata data store, a collaboration graph generation engine, and a collaboration graph analysis engine. The sheet data store is configured to store a plurality of sheets, wherein each sheet includes a set of rows, and wherein each row includes a set of columns. The interaction monitoring engine is configured to monitor interactions by users with the plurality of sheets. The interaction data store is configured to store records of the interactions monitored by the interaction monitoring engine. The sheet metadata data store is configured to store sheet metadata representing relationships between sheets of the plurality of sheets. The collaboration graph generation engine is configured to generate a collaboration graph that represents relationships between the sheets and the users based on the interaction records and the sheet metadata. The collaboration graph analysis engine is configured to analyze vertices the collaboration graph for similarities.

In some embodiments, a method of automatically provisioning new sheets in a collaboration system to match existing sheets is provided. A computing device collects interaction in representing interactions between a plurality of users and a plurality of sheets stored in a sheet data store. A computing device generates a collaboration graph that represents relationships between the sheets and the users. A computing, device calculates similarities between the sheets based in part on the relationships between the sheets and the users. A computing device determines one or more discrepancies within sheets determined to be similar. A computing device updates the sheets determined to be similar to eliminate the discrepancies.

In some embodiments, a method of generating a visualization of collaboratively edited data is provided. A computing device collects interaction information representing interactions between a plurality of users and a plurality of sheets. A computing device generates a collaboration graph that represents relationships between the sheets and the users. A computing device updates the collaboration graph with information regarding similarities between vertices. A computing device generates a visualization based on the updated collaboration graph that illustrates relationships between sheets and relationships between users.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
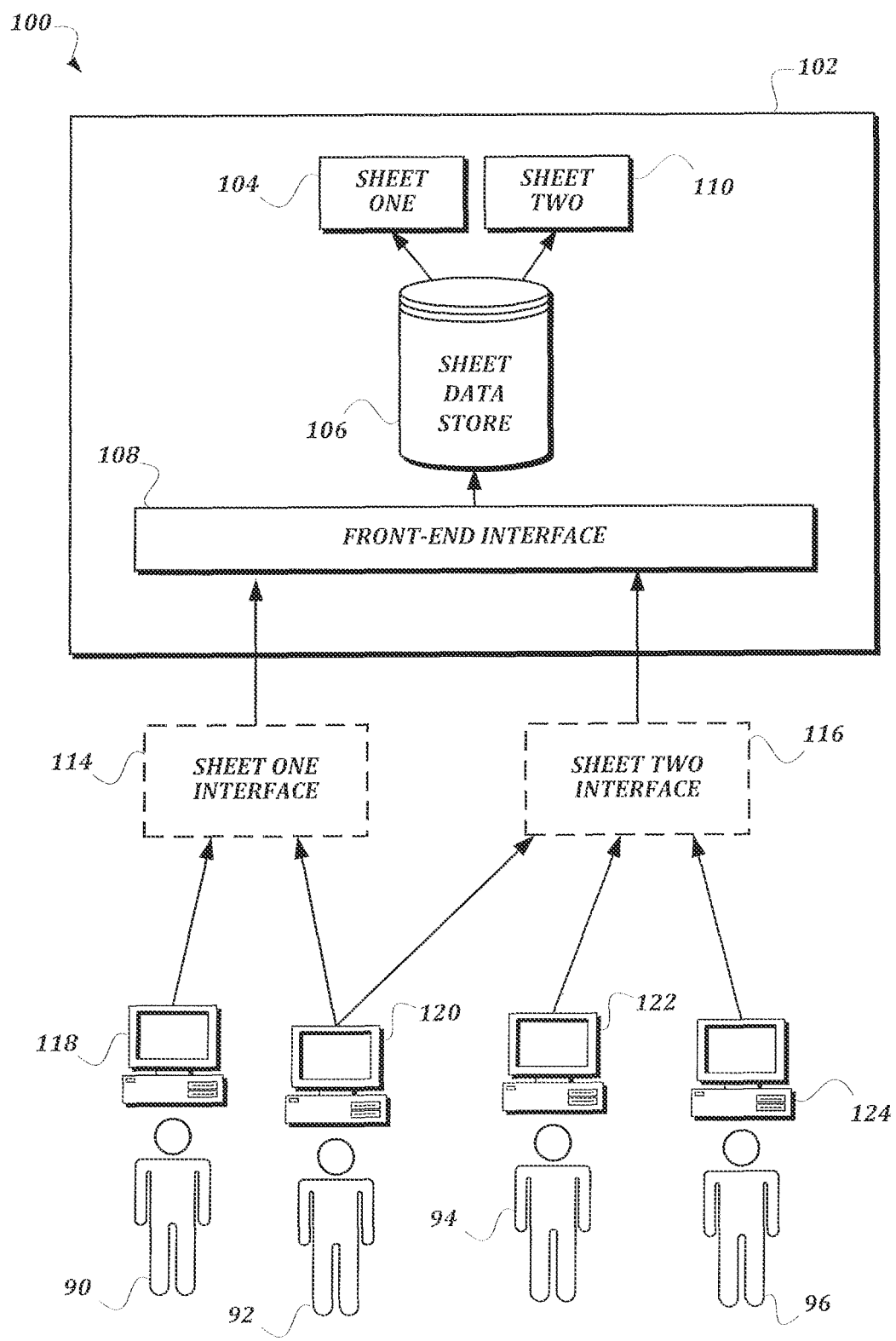
FIG. 1 is a schematic diagram that illustrates, at a high level, some elements of an exemplary embodiment of a system for managing data in a collaboration environment according to various aspects of the present disclosure.

The present disclosure summarizes an innovative model by which relationships between objects and users in a collaborative work environment can be displayed—not as an archetype or a static plan, but as a result of actual worker participation in collaborative projects and processes within the work environment. Relevant collaboration environments are hosted by a server-based system and allow users to interact with sheets that track a set of work-related activities. User, project and process information are defined and stored by users in the sheets, and collaboration via many forms of communication and document type can be integrated and tracked by the sheets. Metadata about the sheets can be stored as well, so that interactions by users on specific elements or through specific collaboration methods can be processed and stored.

Against this collection of individuals and their connections to work-related data in sheets, one can map, query and display a number of data relationships, from interactions with other users or assets, such as documents, associated with a collaborative project. Users, for example, may be tracked and queried in many ways, including without limitation, with whom they collaborate, how they are connected, whether they are inside or outside of an organization or group, their role as defined or assumed by activity, and the level of activity or user attention given to a specific collaboration method, communications channel, document or other work activity.

Sheets may be tracked and queried in many ways, including, without limitation, when and by whom they are viewed or edited; whether they are referenced by other sheets, and how often a sheet is accessed for data via an application programming interface (API). By analyzing certain data, measures of productivity and responsibility such as workload, time allocation, cost per individual worker, and output may be defined and viewed.

Further, visual representations of the tracked collaboration information can present objective indicia of accountability, such as indications of responsibility for tasks, task completion, tasking work within and without the scope of user assignments and user organizational role, and so forth. In this way, coordinated work and process data of all types, and metadata about work activities and users, can be mapped against a dynamic grouping of users and projects within an organization.

Unlike traditional charting and reporting tools which utilize discrete, static tables of data to produce views and graphs, the context of collaboration (as well as use and adoption over time) may be seen using the data visualization tools provided by embodiments of the present disclosure without requiring such relationships to be explicitly defined in the data. This demonstrates the power of dynamic workplace data visualization to produce a view of collaboration, as a composite of users and organization, channels of communication, work content and process. In this way, the context of workplace collaboration is readily understood and open to inspection, since the organization of users and tasks and their communication channels are arranged visually and the elements may be viewed for underlying information. By incorporating data from many workplace sources and displaying this information in the visual context of work, it is possible to navigate the relationships and to find the data where intuitively expected.

Notably, some embodiments of the present disclosure permit reference to far more data than in traditional management software tools. For example, some embodiments of the present disclosure incorporate discrete task information such as schedule, assigned party/user identifier, date of request, work object or document, and approvals, but also include richer information on process data, sales opportunities, dependencies on other users and resources, and so forth. Thus, work-related data of all kinds may be referenced and mapped in the tool and its visual displays, permitting coordinated collaborative processes to be understood and visualized. As well, a visualization of the manner in which an organization adopts the collaboration tools over time can be dynamically generated, and viewed as a dynamic growth chart (akin to a time-lapse video playback, accompanied by maps and charts of related usage and adoption data). This has immediate value for establishing the return on investment in tools and training against worker productivity, sales results, customer contact (channel and communication method, quality and volume), and so forth.

At a high level, embodiments of the present disclosure derive a collaboration graph with respect to data managed by a collaboration system by examining the way work is actually done and those participating in that work. Groupings of users and/or sheets are derived by determining similarities of vertices in the graph, so the groupings emerge from the work activity data rather than being defined a priori in some external system or pulled from a static organizational structure.

In addition, collaboration graphs generated by the present disclosure can take advantage of some known semantics of the sheet data and use that to understand not only that there is a connection between, for example, user A and user B, but to also understand the nature of that connection. For example, items (rows) in a sheet stored in the collaboration system can have people assigned to them, start- and due-dates, and expected durations. Accordingly, user A might assign a work item to user B by assigning a row in a sheet to user B. The collaboration graph will not only represent that user A and user B have a relationship by virtue of communication being exchanged between user A and user B, but it can also include information about what the relationship is, how it is defined, and what it means to both user A and user B. Instead of requiring such information to be statically defined, embodiments of the present disclosure can dynamically derive all of this by inspecting the data it already has, so the information is wholly emergent from the work activity performed in the sheet.

Additionally, in some embodiments, this information is tracked over time so the collaboration graph data case be analyzed for any period or periods of time, and can be presented as an animation through time, or take measurements, such as derivatives respecting the rate of change of work, to determine characteristics of the activity. For example, in some embodiments, the collaboration graph may be recalculated each month, and may be used to show with an animation how workflows change over time, and how the collaborative environment adapts to special projects spinning up and down or broader changes to its work. As another example, this analysis over time may allow a determination that joint participation by user A and user B in a project increases the projected completion rate by a factor of two, by comparing multiple projects in which the users participated versus projects in which they did not participate.

This means that the data processed and visualized by embodiments of the present disclosure is considerably different than that in other social-graph style presentations that utilize statically defined relationships between users and that lack concepts such as row-level assignments, due dates, effort required, and/or the like.

Another problem addressed by some embodiments of the present disclosure is that of managing workloads across non-routine projects. None of the traditional project management, tools work effectively for the non-routine work that constitutes a large and growing portion of the world's employment. These tasks are generally unpredictable and unplanned, don't have expected completion dates, and may have unknown predecessor or successor tasks. The resources doing these tasks can be constrained despite their flexibility, and information should be gathered to allow intelligent load-balancing amongst resources.

Some embodiments of the present disclosure provide a solution to the information-flow problem and allows issues to be identified and appropriate fixes to be determined. Paths through visualizations as described below can be thought of as a display of the various workflows in a collaboration environment, with a sheet or set of sheets defining the content of the workflow and the people participating comprising the resources. The loose structure imparted by embodiments of the present disclosure allows the display of not just well-defined project tasks with start and end dates, durations, and so on, but also unstructured tasks or issues that are simply assigned to each resource. Further, some embodiments of the present disclosure gather and store history on everything that has ever happened in the system, so it might know that while a task in some workflow might not have an estimated duration, the system can calculate what the average duration for a task assigned to that user in that workflow is and use that (or it might calculate average and the standard deviation and create an appropriately buffered duration). Even in cases where no duration can be determined, the system can at least count the number of tasks.

The visualizations described below can then highlight those resources that appear constrained and allow a user to see what the constraints are driven by (e.g. more hours of work than available hours as in the resource view, simple count of tasks, etc.). The user can drill into the visualization to see which workflows those tasks are associated with for the constrained resource, and can then take appropriate action as required, e.g. by re-assigning tasks, changing completion dates, or expanding the working hours.

This approach differs from prior solutions by working for non-structured and semi-structured tasks; by utilizing history on a per-user and per-sheet basis to generate estimates where none are available; by providing a visual display combining the resources and content for all sheets in a collaboration environment; by providing a way for the user to navigate that visual display to identify both resource constraint issues and solutions to those issues across all resources and sheets; by providing a way for the user to update the tasks that make up those sheets to address the identified resource constraint issues; and by working on any data type or object; for example, this works on unstructured data because the similarity analysis is performed on the context of activity and use of the data, not on managing the data type or container per se.

In some embodiments of the present disclosure, collaborative data is stored in one or more "sheets." A sheet is a set of tabular data that includes a set of rows that contain data. One or more columns define cells within the set of rows. Each sheet may have a user of the collaboration system assigned as the sheet's owner. Likewise, each individual element in a sheet (e.g., a row, a column, or a cell) may also have a user assigned as the element's owner, or may otherwise be associated with a user. In some embodiments, a sheet element may refer to an external resource. For example, a cell in a row may include a reference to an external document such as a word processing document, a source code file, and/or any other type of data.

One non-limiting example of a sheet may be used to track tasks to be completed with respect to a project. The rows of such a sheet may each represent a separate task to be completed. Such a sheet may include a first column that identifies a user assigned to the task, as well as other columns that include further information about the task including, but not limited to, a task name, a task description, a reference to an external resource related to the task, a start date, a due date, and a completion percentage.

FIG. 1 is a schematic diagram that illustrates, at a high level, some elements of an exemplary embodiment of a system for managing data in a collaboration environment according to various aspects of the present disclosure. The collaboration environment 100 includes a collaboration system 102 that manages a plurality of sheets, including, as illustrated, sheet one 104 and sheet two 110. The data for each of the sheets is stored in a sheet data store 106, as will be described further below. A front-end interface 108 is generated by the collaboration system 102 to provide access to the sheets to a plurality of users 90, 92, 94, 96 via a plurality of end user computing devices 118, 120, 122, 124. Though the end user computing devices 118, 120, 122, 124 are illustrated as desktop computing devices, some embodiments of the collaboration system 102 support connections front any type of computing device, including but not limited to a laptop computing device, a tablet computing device, a smartphone, a mobile phone, and a server computing device. The end user computing devices 118, 120, 122, 124 may access the front-end interface 108 using a generic client program such as a standard web browser, using a custom client program such as a client application specifically designed to access the collaboration system 102, or using any other suitable technique. The end user computing devices 118, 120, 122 communicate with the collaboration system 102 using any suitable communication technology. Typically, the communication will occur over the Internet, though in some embodiments a local area network, a wide area network, a WiFi network, a Bluetooth connection, an LTE (or other type of mobile broadband) network, or any other type of suitable communication technology may be used instead of or in addition to the Internet.

As illustrated, the front-end interface 108 provides an interface to sheet one 114 and an interface to sheet two 116. The first user 90 and the second user 92 access sheet one 104 via the interface to sheet one 114. The second user 92 also accesses sheet two 110 via the interface to sheet two 116, as do the third user 94 and the fourth user 96. In some embodiments, the users 90, 92, 94, 96 may be present in a single physical location, while in other embodiments, the users 90, 92, 94, 96 may be separated in two or more physical locations.

Though only a small number of users, a small number of sheets, and a small number of interactions with sheets are illustrated, some basic insights regarding the collaboration environment 100 may nevertheless be gathered by analyzing the interactions. For example, because both the first user 90 and the second user 92 interact with sheet one 104, these users are likely to be associated with each other. Likewise, because the second user 92, the third user 94, and the fourth user 96 interact with sheet two 110, these users are likely to be associated with each other as well. Meanwhile, the first user 90 is not likely to be associated with the third user 94 or the fourth user 96, as they have no interactions in common. As another example, the first user 90, the third user 94, and the fourth user 96 each interact with only a single sheet, which implies that they are rank-and-file employees of an organization that deployed the collaboration environment 100. The second user 92 interacts with more than one sheet, which implies that the second user 92 has a supervisory role in the organization.

Roles for users 90, 92, 94, 96 may be automatically identified by the collaboration system 102 by comparing interactions for a user to one or more threshold levels of interactions of various types that are determined to identify users that likely belong to the roles, including but not limited to thresholds relating to numbers of interactions related to sheet editing, sheet assignments to other users, approval of edits made to sheets or documents referred to by sheets, transmitting update requests to other users.

For example, with a larger collection of sheets and users, and insight into the changes being made to those sheets, a broader set of connections and implied roles can be derived by inspection of the interactions tracked for users and information about the users profiled in the collaboration environment 100. Users who open many sheets but make few edits are likely to be managers building an overall view of the organization's work. Those who edit sheets, but primarily update columns with people in them (e.g. where a column type is "Contact" and/or where columns include references to other users) are likely to be supervisors who are allocating work across a team but performing less of that work themselves. Conversely, those who edit sheets but primarily edit columns with titles determined to be semantically close to "Status" (multi-value) or "Done" (Boolean value) are likely to be individual contributors actually performing the work. Users who most frequently create new items in project-management oriented sheets (e.g. those with columns for Start- and End-Dates, Predecessors, and Duration) are most likely to be filling project planning roles. Of course any given user may be filling more than one of these roles depending on the organization.

The objects such as sheets or portions thereof that compose work being done in a given application can be analyzed to extract relationships in a manner similar to the manner in which the users are analyzed above. Sheets that are organized together in the sheet navigation system (similar to the file system in a single-user computer) are more likely to be part of a single workflow. Those sheets that have cell links between them are also more likely to be part of a given workflow, as are sheets that are bound together by one or more reports. Further, those workflows, once identified, can be themselves grouped into meta-workflows, or flows-constructed of workflows. Of course, this process can repeat. For example, there may be a set of linked sheets that make up a workflow used by a web-store team in a company to manage the products available on the store. That workflow itself might be part of a meta-workflow for managing the overall website for the company, and that 2nd-order flow might be part of a 3rd-order flow composed of all of the marketing activities for that company.

A further set of connections can be calculated by combining the user-focused connections with the sheet-focused connections described above. A workflow may be calculated to be more cohesive and distinct from another workflow if the sheets themselves are distinct (e.g. not stored or linked together) and the users involved are different as well. These relationships also recurse when inspected at higher levels of the workflow hierarchy, so the users involved in one 2nd-order workflow but not involved in another 2nd-order workflow may be considered to compose a de-facto division in the organization (which may be completely distinct from any explicit organizational division). Visual display of this information may provide useful insights for human resource decisions, and for physical and IT resource planning, for example.

Figure 2:
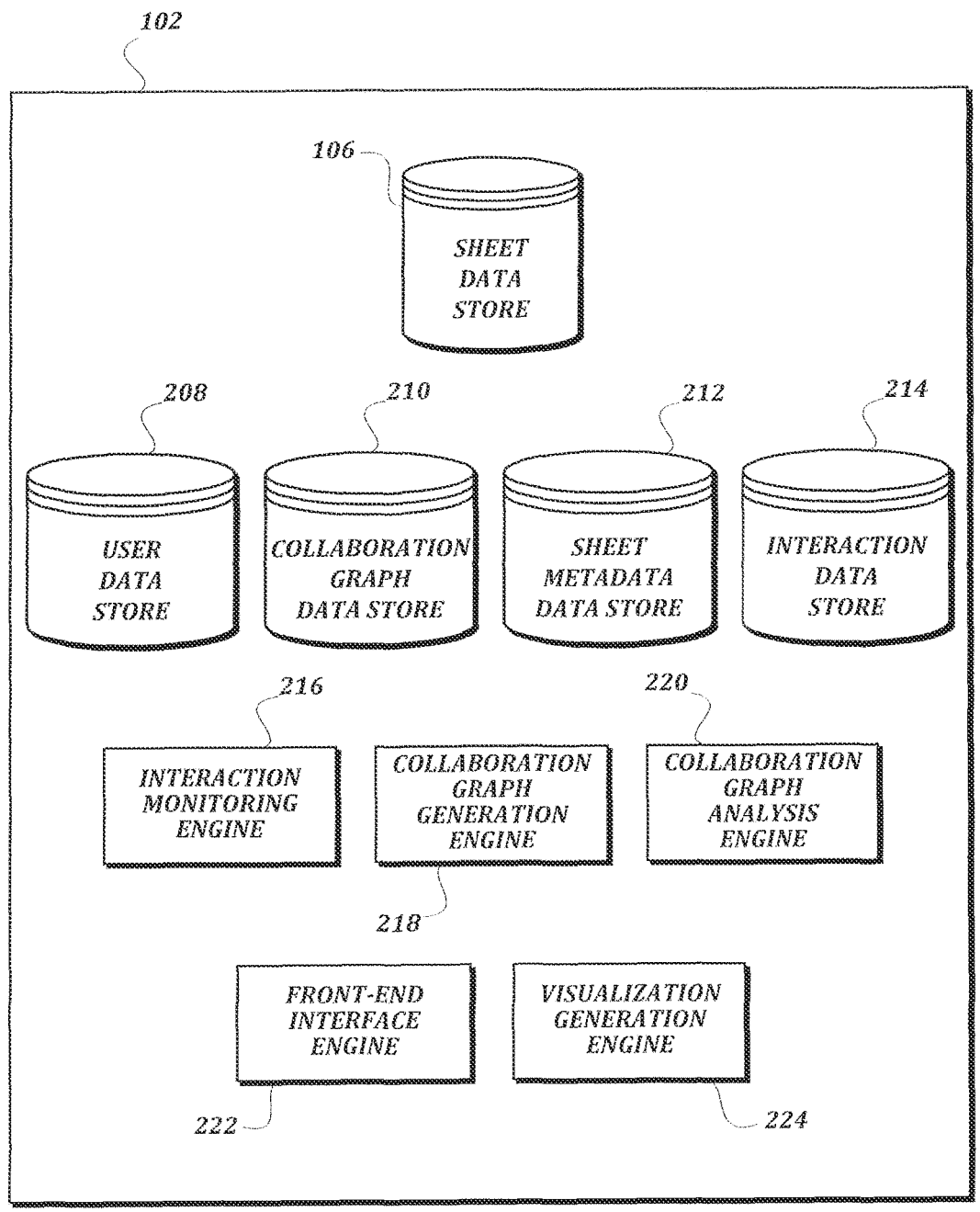
FIG. 2 is a block diagram that illustrates various elements of an exemplary embodiment of the collaboration system according to various aspects of the present disclosure.

FIG. 2 is a block diagram that illustrates various elements of an exemplary embodiment of the collaboration system according to various aspects of the present disclosure. As illustrated, the collaboration system 102 includes a sheet data store 202, a user data store 208, a collaboration graph data store 210, a sheet metadata data store 212, and an interaction data store 214.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

The sheet data store 202 is configured to store sheet information, including row data and the other sheet information discussed above. In some embodiments, the sheet data store 202 may also store documents associated with or referred to by sheets, while in other embodiments, the sheet data store 202 may simply include references to such documents in another data store, a file system, a file server, a document management system, a source management system, a cloud storage system, and/or any other location at which the associated document may be found.

The user data store 208 is configured to store user records that identify users registered with the collaboration system 200. Each user record includes at least a user identifier (such as a unique user name, email address, and/or the like) associated with the user that is usable to associate the user record with other entities within the collaboration system 102 (such as sheets, rows, and/or the like). In some embodiments, the user record may also include further information about the user, including but not limited to login credentials, a full name of the user, a job title, an organization name, a job description, one or more skills possessed by the user, and/or the like. In some embodiments, the collaboration system 102 may use a third party to authenticate users via a technology such as OAuth, OpenID, and/or the like. In such embodiments, the user identifier may be a unique identifier of the user at the third party, such as a Twitter handle, a Facebook user name, a Microsoft account identifier, and/or the like.

The sheet metadata data store 212 is configured to store contextual information that describes how sheets stored in the sheet data store 202 relate to other entities in the collaboration environment 100. Records in the sheet metadata data store 212 may include information about each sheet including, but not limited to, a name of the sheet, a description of the sheet, timestamp information related to when the sheet was created, last accessed, and last modified, a user that owns the sheet, a set of users that have permissions to view and/or edit the sheet, a set of users that are assigned to the sheet or a portion thereof, and/or the like.

The interaction data store 214 is configured to store records of interactions between users that involve the sheets. The types of interactions for which records are created in the interaction data store 214 may include, but are not limited to, a view of a sheet by a user, an edit of a sheet by a user, an assignment of a sheet by a first user to a second user, a change in permissions on a sheet submitted by a first user on behalf of a second user, a share of a sheet by a first user to a second user, an update request for a sheet sent by a first user to a second user, an update response for the sheet sent by the second user to the first user, a discussion message sent by a first user to a second user that references a sheet, and/or the like. Though the interactions listed above are stated at the sheet level, in some embodiments, similar interactions may be recorded on a sheet element level (e.g., an edit of a row in a sheet by a user, and the like).

The collaboration graph data store 210 is configured to store collaboration graphs. A collaboration graph is a machine-readable construct that represents relationships in the collaboration environment 100. In some embodiments, the collaboration graphs are built based on at least the interaction records from the interaction data store 214, and may also incorporate other information such as the sheet metadata information, user record information, and/or the like. Each collaboration graph is a collection of vertices and edges. In some embodiments, one type of vertex of the graph represents users, and another type of vertex in the graph represents sheets. In some embodiments, there are vertices that represent parts of sheets such as rows, columns, cells, and/or the like, while in other embodiments the information for elements of a sheet is incorporated into a single vertex for the sheet. Edges of the graph represent information stored in the information records, and connect a user vertex and a sheet vertex. In some embodiments, the edges are directed to indicate whether a user initiated the interaction or was the recipient of the interaction. In some embodiments, the edges are undirected. After processing, vertices or edges in the communication graphs may also include similarity information, influence information, group information, or role information, as discussed further below.

The collaboration system 102 also includes a front-end interface engine 222, a visualization generation engine 224, an interaction monitoring engine 216, a collaboration graph generation engine 218, and a collaboration graph analysis engine 220. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Software engines may be callable from other engines or from themselves. Generally, the engines described herein refer to logical modules that can be merged with other engines or applications, or can be divided into sub-engines. The engines can be stored in any type of computer readable medium or computer storage device and be stored on and executed by one or more general purpose computers, thus creating a special purpose computer configured to provide the engine. Accordingly, the collaboration system 102 comprises one or more computing devices configured to provide the illustrated engines, though the computing devices themselves have not been illustrated for the sake of clarity.

The front-end interface engine 222 is configured to provide one or more interfaces to the various types of data stored within the collaboration system 102. One example of an interface provided by the front-end interface engine 222 is a sheet interface that allows creation and editing of sheets, including assignment and/or sharing of sheets and/or portions thereof. Another example of interfaces provided by the front-end interface engine 222 are various interfaces that provide visualizations of collaboration graph information, which are described further below. Some interfaces provided by the front-end interface engine 222 may provide query and/or filtering functionality, either as stand-alone queries or in conjunction with a visualization interface. As discussed above, the interfaces may be provided by the front-end interface engine 222 as a standard web interface, as an API that provides data access to a stand-alone application that executes on an end user computing device to present the interface to a user, or using any other suitable interface generation technique known to one of ordinary skill in the art. Yet another example of an interface provided by the front-end interface engine 222 is an email interface that allows users to share portions of the information stored in the system 102 with external users via email.

The interaction monitoring engine 216 is configured to monitor interactions involving sheets, and stores records of the interactions in the interaction data store 214, as described above. In some embodiments, the interaction monitoring engine 216 may be configured to receive notifications of the interactions from the front-end interface engine 222. In some embodiments, the interaction monitoring engine 216 may be configured to receive notifications from the sheet data store 106 upon access or modification of records therein. The collaboration graph generation engine 218 is configured to collect and store the vertices and edges of a collaboration graph, as discussed above, based on data from the interaction data store 214 and possibly also from the sheet metadata data store 712.

The collaboration graph analysis engine 220 is configured to analyze the collaboration graph to surface rich information regarding the collaboration environment 100. In some embodiments, the collaboration graph analysis engine 220 updates the collaboration graph with one or more of similarity information, workload information, and/or role information. The visualization generation engine 224 is configured to use the updated collaboration graph to generate one or more visualizations of the collaboration environment 100. In some embodiments, the visualizations may be provided as a static image, an interactive visualization interface, an animation, or in any other suitable format.

Further descriptions of the components of the collaboration system 102 introduced above are provided below.

Figure 3A:
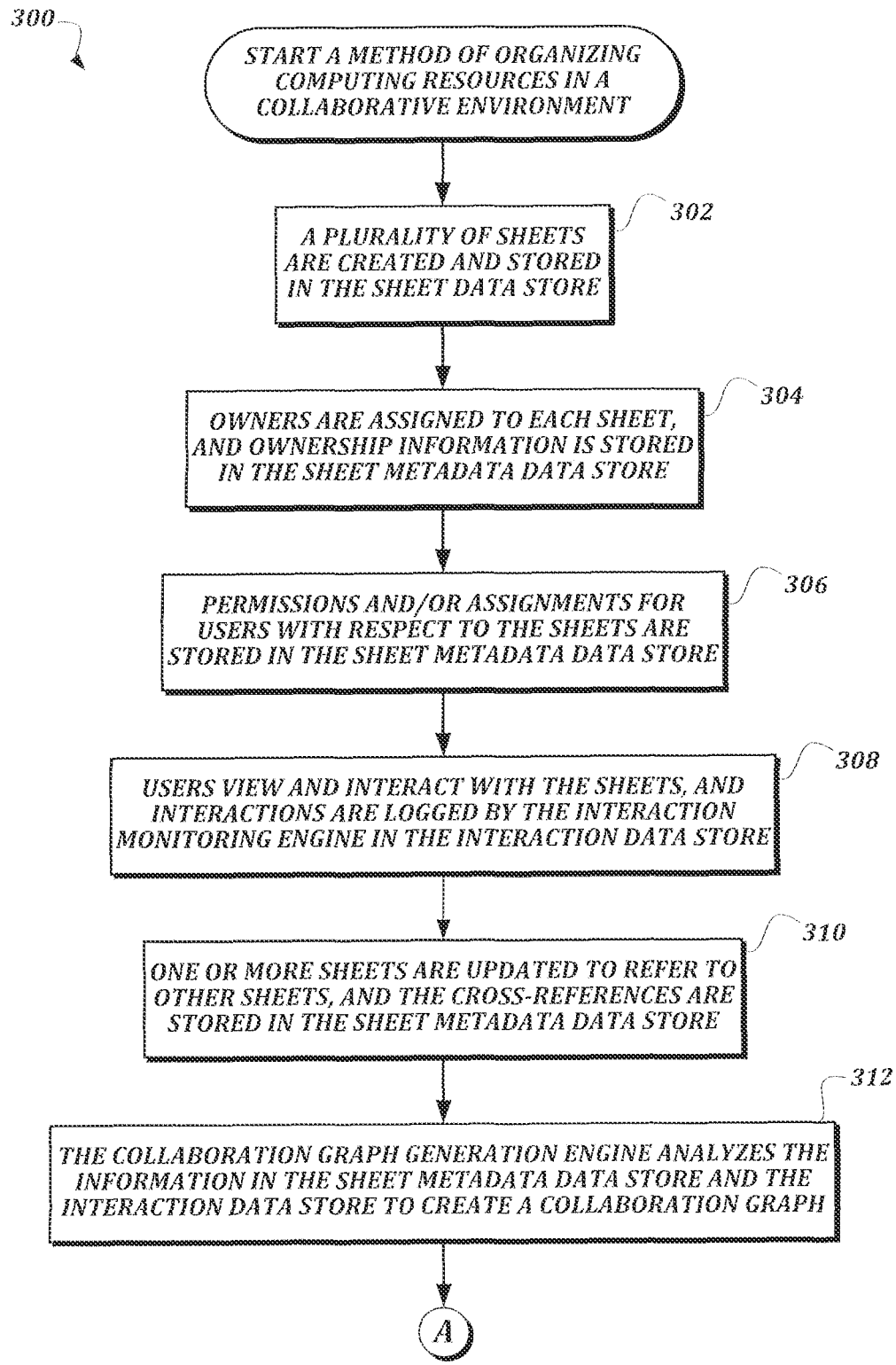
FIGS. 3A-3B are a flowchart that illustrates an exemplary embodiment of a method of organizing computing resources in a collaboration environment according to various aspects of the present disclosure.
Figure 3B:
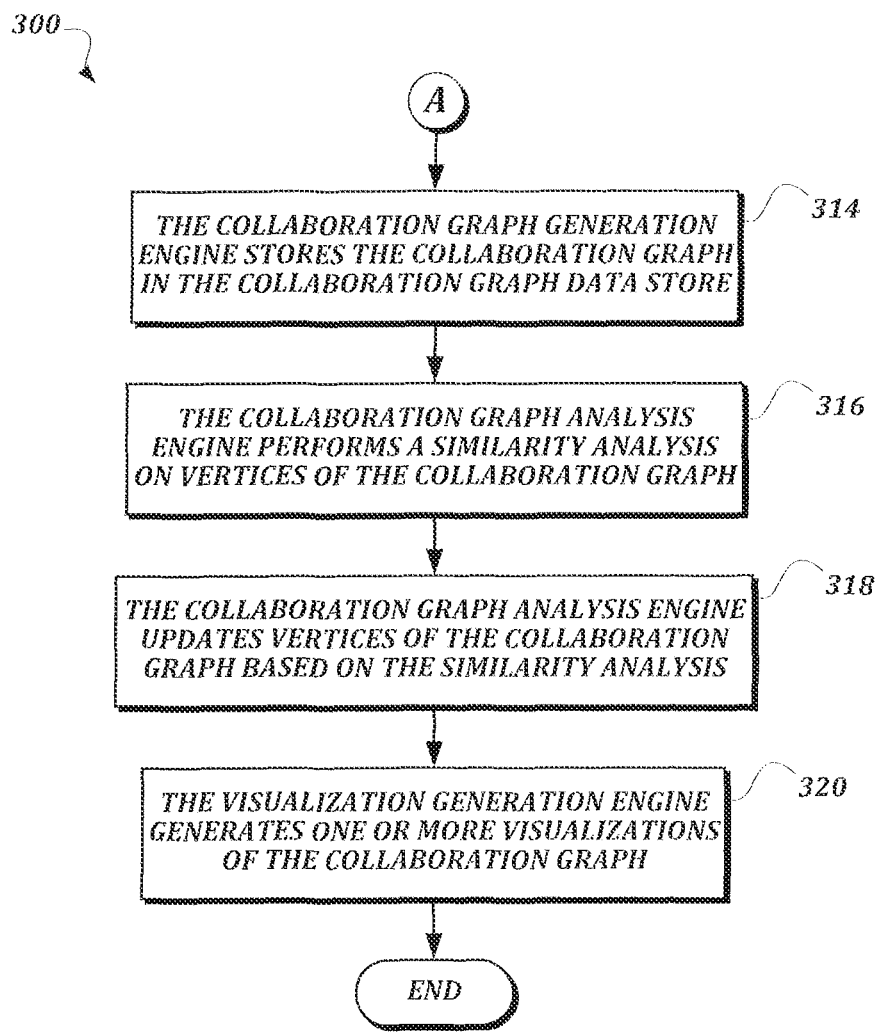

FIGS. 3A-3B are a flowchart that illustrates an exemplary embodiment of a method of organizing computing resources in a collaboration environment according to various aspects of the present disclosure. From a start block, the method 300 proceeds to block 302, where a plurality of sheets are created and stored in the sheet data store 202. In some embodiments, the creation of each sheet might simply constitute creating a record in the sheet metadata data store 212 defining the sheet, and the subsequent creation of rows is what first causes information to be stored in the sheet data store 202.

At block 304, owners are assigned to each sheet, and ownership information is stored in the sheet metadata data store 212. In some embodiments, owners are users of the system 102 associated with user records stored in the user data store 208. In some embodiments, an initial owner of a sheet may be identified and stored in the sheet metadata data store 212 during sheet creation, instead of separately at block 304. In some embodiments, more than one owner may be assigned to the sheet as a whole. In some embodiments, owners may be assigned to individual rows, cells, or other elements within sheets. In some embodiments, owners of a sheet may have administrator-level privileges with respect to the sheet. In some embodiments, being identified as an owner of a sheet may merely indicate a higher level of affinity between an identified user and the sheet compared to other users that merely have permissions to access the sheet.

At block 306, permissions and/or assignments for users with respect to the sheets are stored in the sheet metadata data store 212. With regard to permissions, a given sheet or portions thereof may default to providing no access, and the collaboration system 102 will prevent access to the given sheet unless permissions to view and/or modify the sheet are explicitly granted to the requesting user. Similar to ownership, assignments may provide a user with a greater level of access to the assigned sheet or portion thereof, or may simply indicate a higher level of affinity between the assigned user and the assigned sheet or portion thereof. In some embodiments, the assignment may indicate that the assigned user is responsible for a task defined by the assigned portion of the sheet. If the portion of the sheet also includes an indication of an amount of work expected and/or completed for the task, then the assignment can be used to help predict an amount of work being handled by the user, as will be discussed further below.

At block 308, users view and interact with the sheets, and interactions are logged by the interaction monitoring engine 216 in the interaction data store 214. At block 310, one or more sheets are updated to refer to other sheets, and the cross-references are stored in the sheet metadata data store 212. In some embodiments, the cross-references could be a cell or formula in a first sheet that references a value, formula, or other element in a second sheet, and/or the like. In some embodiments, the cross-references may simply be an indication that the sheets are related, without actually linking any information between the sheets.

Next, at block 312, the collaboration graph generation engine 218 analyzes the information in the sheet metadata data store 212 and the interaction data store 214 to create a collaboration graph. The collaboration graph generation engine 218 uses the sheet identifying information in the sheet metadata data store 212 to create a set of sheet vertices for the collaboration graph, and uses the user records in the user data store 208 to create a set of user vertices for the collaboration graph. Then, the collaboration graph generation engine 218 reviews the interaction records in the interaction data store 214 to create edges for the graph that connect the user vertices to the sheet vertices. Each edge may be labeled by the collaboration graph generation engine 218 to indicate a type of interaction. For example, a first user opening a first sheet to view information would cause a view interaction record to be created, and the collaboration graph engine 218 would create an interaction edge from the first user to the first sheet that is labeled as a view interaction. A similar edge would be created for an edit interaction, though it would be labeled as an edit interaction.

Other types of interactions may cause more complex updates to the collaboration graph. For example, a share interaction record represents a first user sharing a sheet (or a portion thereof) to a second user. In some embodiments, this record may cause two edges to be added to the collaboration graph: a first edge connecting the first user to the sheet, and a second edge connecting the second user to the sheet. The first edge would be labeled as an outgoing share interaction, and the second edge would be labeled as an incoming share interaction. One of ordinary skill in the art will recognize that edges that are similar but that are labeled properly may be added to the collaboration graph for other interactions related to sheets between users, including but not limited to granting permissions, assigning a sheet or sheet element to another user, update requests, update responses, discussion messages, and/or the like.

The method 300 then proceeds to a continuation terminal ("terminal A"). From terminal A (FIG. 3B), the method 300 proceeds to block 314, where the collaboration graph generation engine 218 stores the collaboration graph in the collaboration graph data store 210. At block 316, the collaboration graph analysis engine 220 conducts a similarity analysis on vertices of the collaboration graph. At a high-level, the similarity analysis is conducted to determine which sheets are related to one another. The similarity analysis may also determine which users are related to one another, by virtue of being associated with related sheets. As discussed above, in some embodiments sheets that are related to each other may be considered part of a "workflow."

Similarity between two sheets may be calculated using one or more of a number of techniques. In some embodiments, similarities may be determined by grouping sheet vertices together based on matching information in the sheet metadata. For example, all of the sheets owned by a first user may be placed in a first group, while all of the sheets owned by a second user may be placed in a second group. Such groupings may have more than one level, such that the sheets owned by the first user may be further grouped by matching titles, matching attached documents, matching assignees, and/or the like.

In some embodiments, the collaboration graph analysis engine 220 may build a comparison matrix that holds comparison scores of each sheet in the sheet data store 106 to each other sheet. The collaboration graph analysis engine 220 then inspects the collaboration graph to count the number of edges that pairs of sheets have in common, and establishes a comparison score based on the count. For example, the collaboration graph analysis engine 220 may increment a comparison score for a pair of sheets when both sheets have an edge from the corresponding sheet vertex to a given user vertex. Further analysis of the edge may be performed as well, such as incrementing the comparison score by a larger amount if the type of edge (e.g., a view, an edit, an outgoing share) also matches, or incrementing the comparison score by a larger amount if a pattern of multiple edges matches (e.g., both sheets have an edge indicating an outgoing share interaction from a first user, and an edge indicating an incoming share interaction to a second user).

In some embodiments, the comparison score for a pair of sheets may also be affected by a semantic comparison of the sheets themselves. Elements from the sheet metadata data store 212 for each pair of sheets may be compared using any semantic similarity detection technique known to one of ordinary skill in the art. For example, the collaboration graph analysis engine 220 may determine if the pair of sheets has one or more of a matching owner, matching assignees, matching names, matching tags, matching referenced documents, matching terms in a description, matching column names and/or data types, and/or the like. The collaboration graph analysis engine 220 may use this information to determine a semantic similarity score for the pair of sheets, and use the semantic similarity score to either increase or reduce the comparison score in the comparison matrix. In some embodiments, each of the compared attributes may be weighted differently in determining the semantic similarity score. In some embodiments, the semantic similarity score may be used instead of the comparison score that is based on a count. Once similarity scores are calculated, the collaboration graph analysis engine 220 may perform any community detection routine known to one of ordinary skill in the art to assign groups to the sheet vertices.

In some embodiments, an analysis of the user vertices is also performed by the collaboration graph analysis engine 220. For example, the edges for each user vertex may be counted in order to develop a user activity profile for the user. For example, a given user vertex may be associated with 20 view interactions, 10 edit interactions, 15 outgoing share requests, and 2 incoming share requests. These totals would be collected by the collaboration graph analysis engine 220 and associated with the user vertex.

At block 318, the collaboration graph analysis engine 220 updates vertices of the collaboration graph based on the similarity analysis. With respect to the sheet vertices, each vertex may be tagged by the collaboration graph analysis engine 220 with one or more group identifiers that indicate the matching sheet metadata to be used to group the given sheet with other sheets. If a similarity score matrix was established and communities in the sheets were detected, then each community may be automatically assigned a community identifier to be used to tag sheet vertices in the community.

Note that the use of a multi-dimensional graph analysis in the manner described to build a graph of connections between sheets provides numerous benefits. While the parameters set for analysis to derive a data set for a given view vary widely, some aspects of the use of the collaboration environment 100 and related activity sheet illustrate the richness of the environment. A sheet is composed of a collection of associated users, structure (column types and row hierarchy), and data elements. Further, the sheet exists through time, so each of those things changes as time passes, and history data is recorded. Note that each of the elements defining a sheet can be thought of as possessing both a set of positions and vectors through the space of potential values over time; a trend analysis or table of history data may be composed on a given element using this data. Further, in calculating edges between two sheets, the representation of the history data may be included and views or animations displaying transformation over time created. One may also calculate edges between each of those sub-sheet entities as well, and can trace them as they change through time. This means that there are at least, two levels of collaborative activity analysis available first, a multi-dimensional graph with edges and nodes, and counts (including scores or weights) for both. The second is the visualization or that graph, in a multitude of ways, determined by defining the underlying graph through selection from the set of available nodes and edges, and filtering for weights.

With respect to the user vertices, in some embodiments the user vertex may be updated with the totals collected by the collaboration graph analysis engine 220. In some embodiments, the user activity profile may be used to determine a type for the user, and the user vertex may be tagged with the determined type instead of the totals. For example, the collaboration graph analysis engine 220 may be configured to label all users having a greater number of view interactions than edit interactions as "Reviewers," and to label all users having a greater number of edit interactions than view interactions as "Editors." As another example, the collaboration graph analysis engine 220 may establish thresholds for each type of interaction, and reaching these thresholds may cause the user to be given a particular label. In such an example, separate thresholds for update request interactions and edit interactions may be established. If a user has a greater number of update request interactions than the corresponding threshold, then the user will be labeled as a "Project Manager." If a user has a greater number of edit interactions than the corresponding threshold, then the user will be labeled as a "Key Contributor." Multiple thresholds may be used to determine a single label (e.g., a "Development Manager" label may require reaching both an edit interaction threshold and an update request threshold).

In some embodiments, once the vertices of the collaboration graph have been updated, other resource optimizations may be provided. As one non-limiting example, once sheets are combined into a group, discrepancies between sheets in the group may be detected and automatically addressed. For example, a new sheet may have been created that was placed by the collaboration graph analysis engine 220 into a group with multiple older sheets based on a matching title. The older sheets may all have matching permissions that are not shared by the new sheet. By virtue of being organized into the group, the permissions from the older sheets may be automatically copied to the new sheet by the collaboration graph analysis engine 220 in order maintain consistency within the group. This automatic provisioning of new sheets can save significant communication costs by reducing the number of network-based interface interactions that would have to be performed to manually apply the permissions to the new sheet.

At block 320, the visualization generation engine 224 generates one or more visualizations of the collaboration graph. The updated vertices in the collaboration graph allow complex visualizations of the collaboration graph to be generated that would not otherwise be possible without having tracked the interactions with the sheets, and then processing the interaction information along with the sheet metadata as described above. Some non-limiting examples of such visualizations are described below.

From block 320, the method 300 proceeds to an end block and terminates.

In some embodiments, portions of the method 300 may be performed repeatedly to generate multiple collaboration graphs at different points in time. In such embodiments, the most recently generated collaboration graph will represent the current state of the collaboration environment 100, and differences in the collaboration graphs can be used to show changes in the collaboration environment 100 over time. Such information can be particularly useful in illustrating adoption of the collaboration system 102 across an organization.

Figure 4:
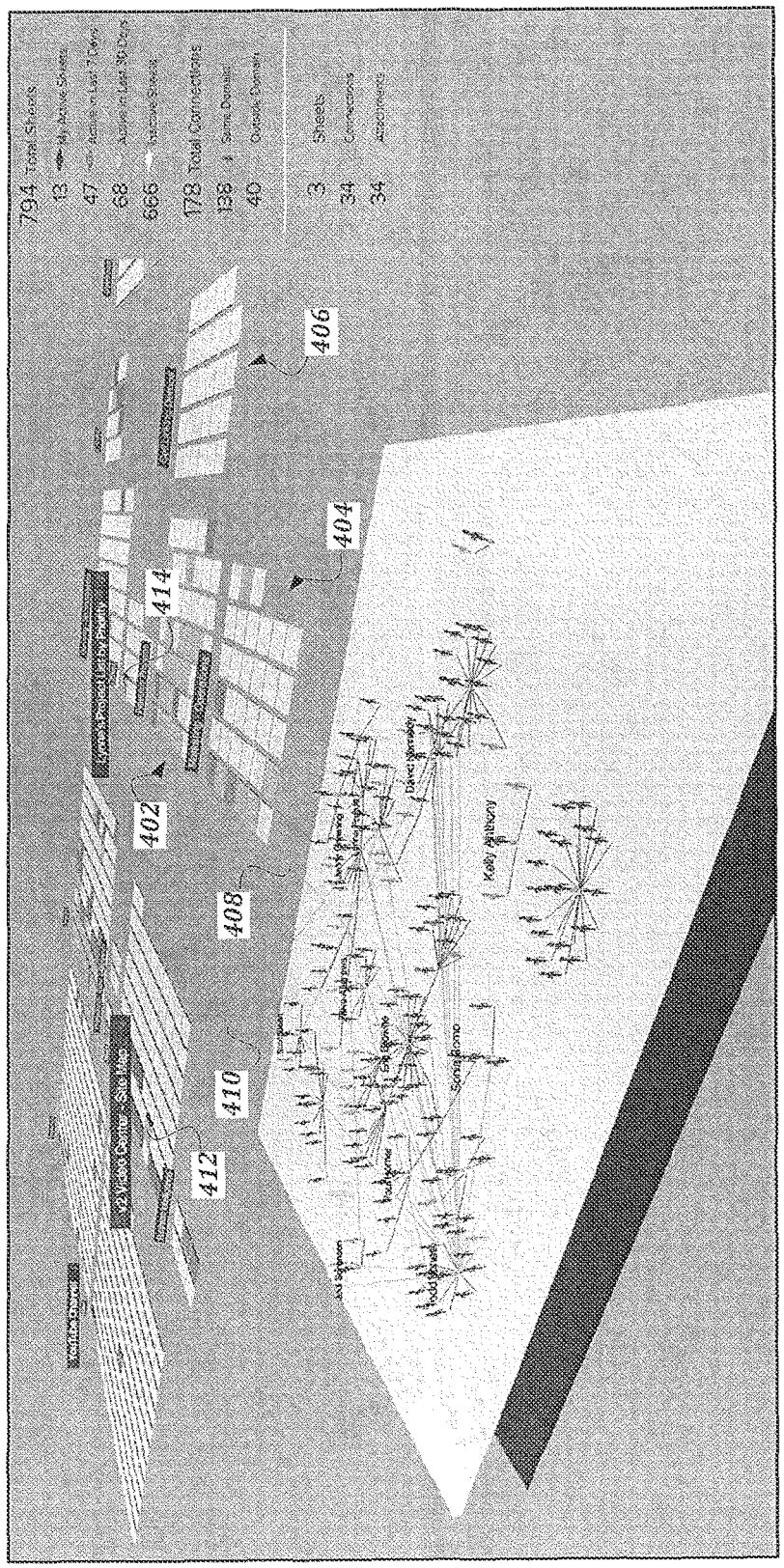
FIG. 4 illustrates an exemplary embodiment of a visualization of a collaboration graph generated by the visualization generation engine that shows sheets and users in separate levels.

FIG. 4 illustrates an exemplary embodiment of a visualization of a collaboration graph generated by the visualization generation engine 224 that shows sheets and users in separate levels. The user vertices of the collaboration graph are illustrated in a lower level by a plurality of person-shaped user icons, and the sheet vertices of the collaboration graph are illustrated in an upper level by a plurality of box-shaped sheet icons. The updates added to the sheet vertices allow the sheets to be grouped in the visualization according to similarity, such as in a first sheet group 402, a second sheet group 404, and a third sheet group 406. Information stored in the edges of the collaboration graph allows the visualization generation engine to shade the sheet icons based on when the most recent interaction with the sheet occurred. Further, the interaction information stored in the collaboration graph allows interaction lines 410, 408 to be drawn between selected sheets 412, 414 and their associated users (e.g., the owners of the sheets) in the user level. In some embodiments, the visualization illustrated in FIG. 4 may be interactive, such that other sheets could be selected, filters or search queries could be applied, and/or the like. In some embodiments, the selected sheets 412, 414 may be automatically selected by the visualization generation engine 224 by virtue of the sheets being the most commonly accessed sheets associated with a given user.

Figure 5:
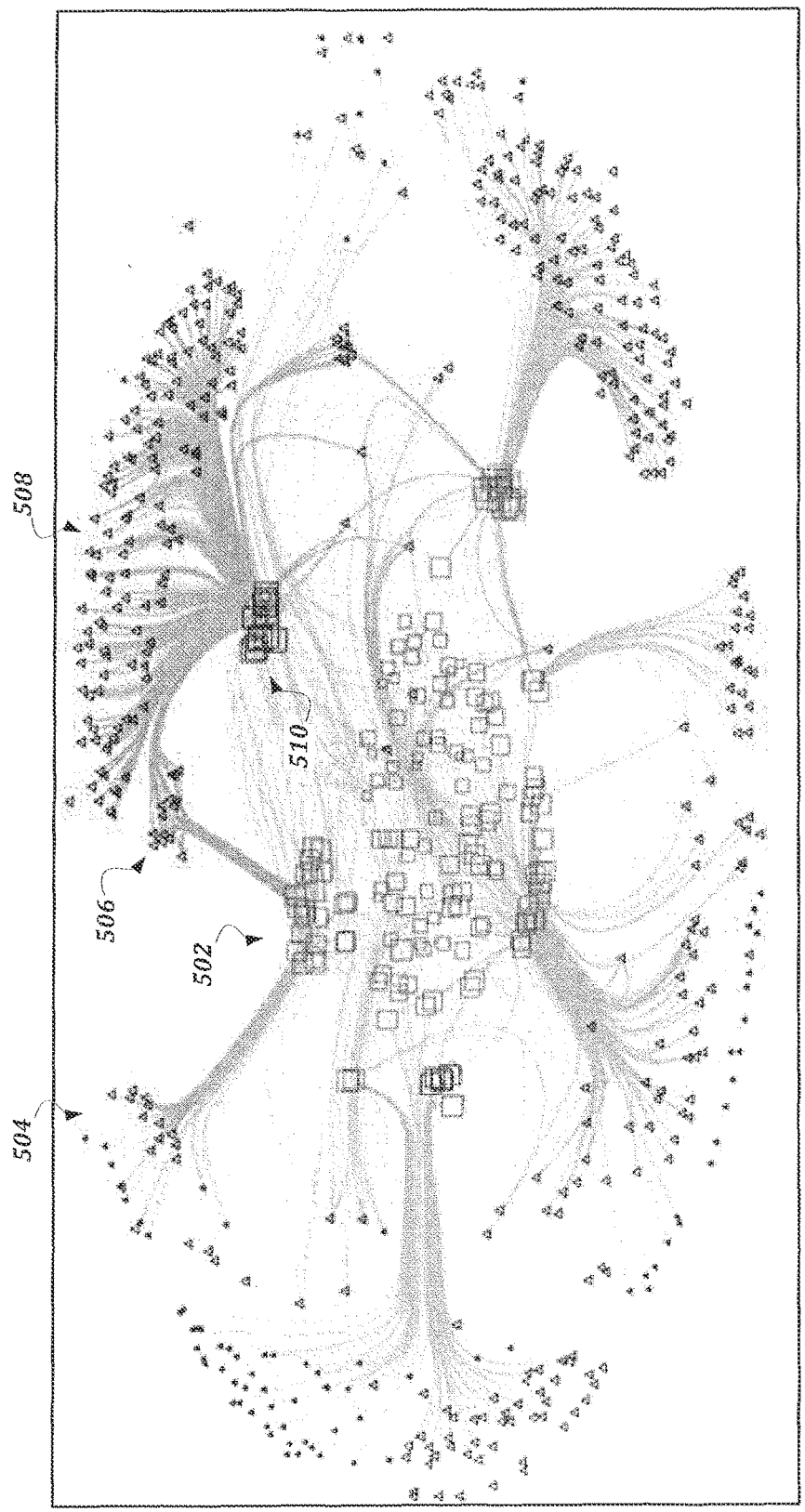
FIG. 5 illustrates an exemplary embodiment of a visualization of a collaboration graph generated by the visualization generation engine that shows groups of sheets arranged according to the similarity information stored in the sheet vertices.

FIG. 5 illustrates an exemplary embodiment of a visualization of a collaboration graph generated by the visualization generation engine 224 that shows groups of sheets arranged according to the similarity information stored in the sheet vertices. In the visualization, sheets are represented by squares, users are represented by triangles, and lines connecting the two represent shares. Two groups of sheets are illustrated in the visualization: a first group 502 and a second group 510. Simply based on this grouping and the arrangement of users according to their interactions with the grouped sheets, the functional organizational structure of the collaboration environment 100 becomes apparent. There is a first group of users 504 who primarily work with the first group of sheets 502, and there is a second group of users 508 who work primarily with the second group of sheets 510. There is also a third group of users 506 who work with both the first group of sheets 502 and the second group of sheets 510. Even without knowing anything about the corporate structure of the entity represented by the visualization, it is apparent that the third group of users 506 is critical to the entity regardless of the corporate structure, at least because they act as the bridge between the first group of users 504 and the second group of users 508. Without the analysis performed by the collaboration system 102 and the visualizations enabled thereby, such non-intuitive insights could not be surfaced.

Figure 6A:
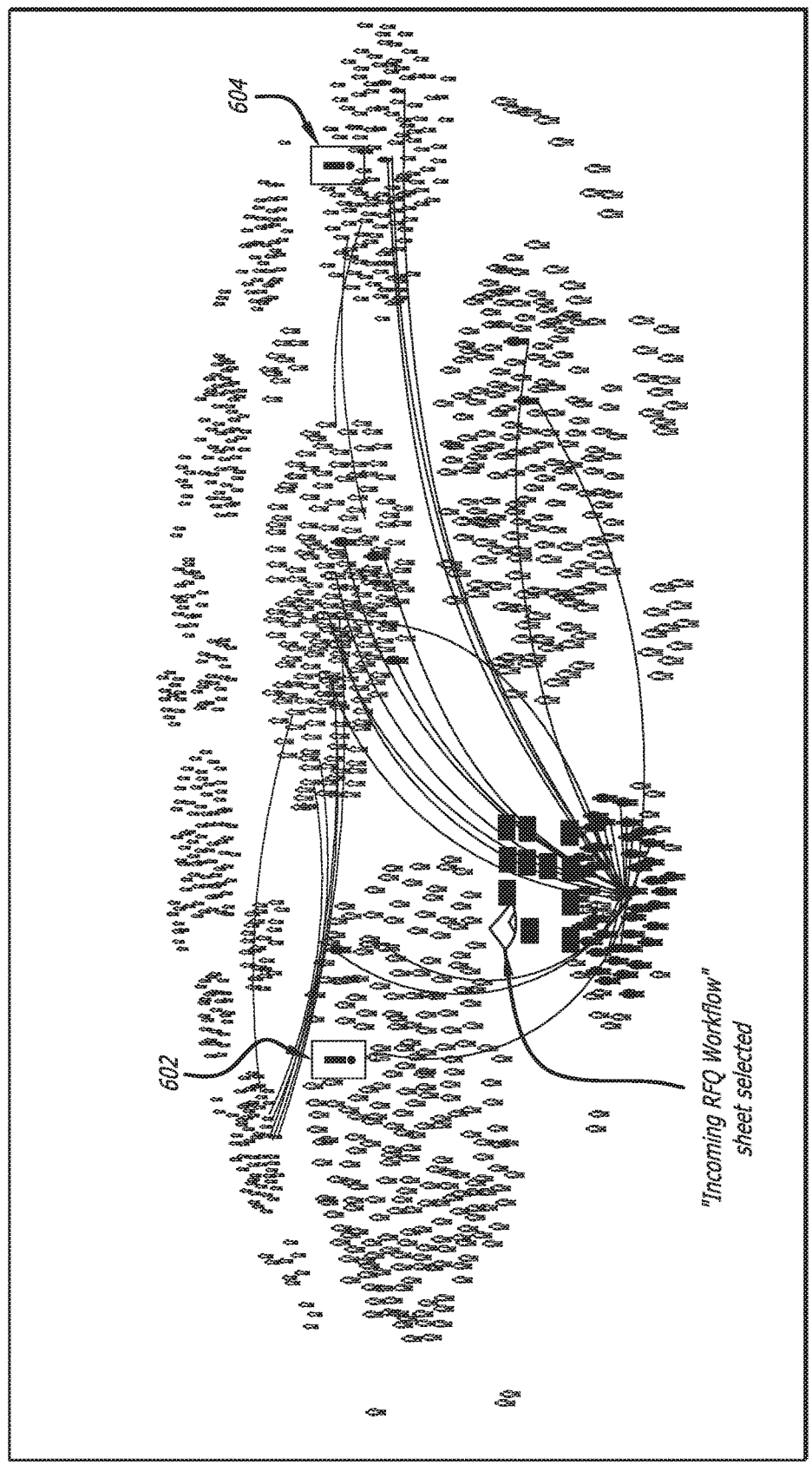
FIGS. 6A and 6B illustrate another exemplary embodiment of a visualization of a collaboration graph generated by the visualization generation engine.
Figure 6B:
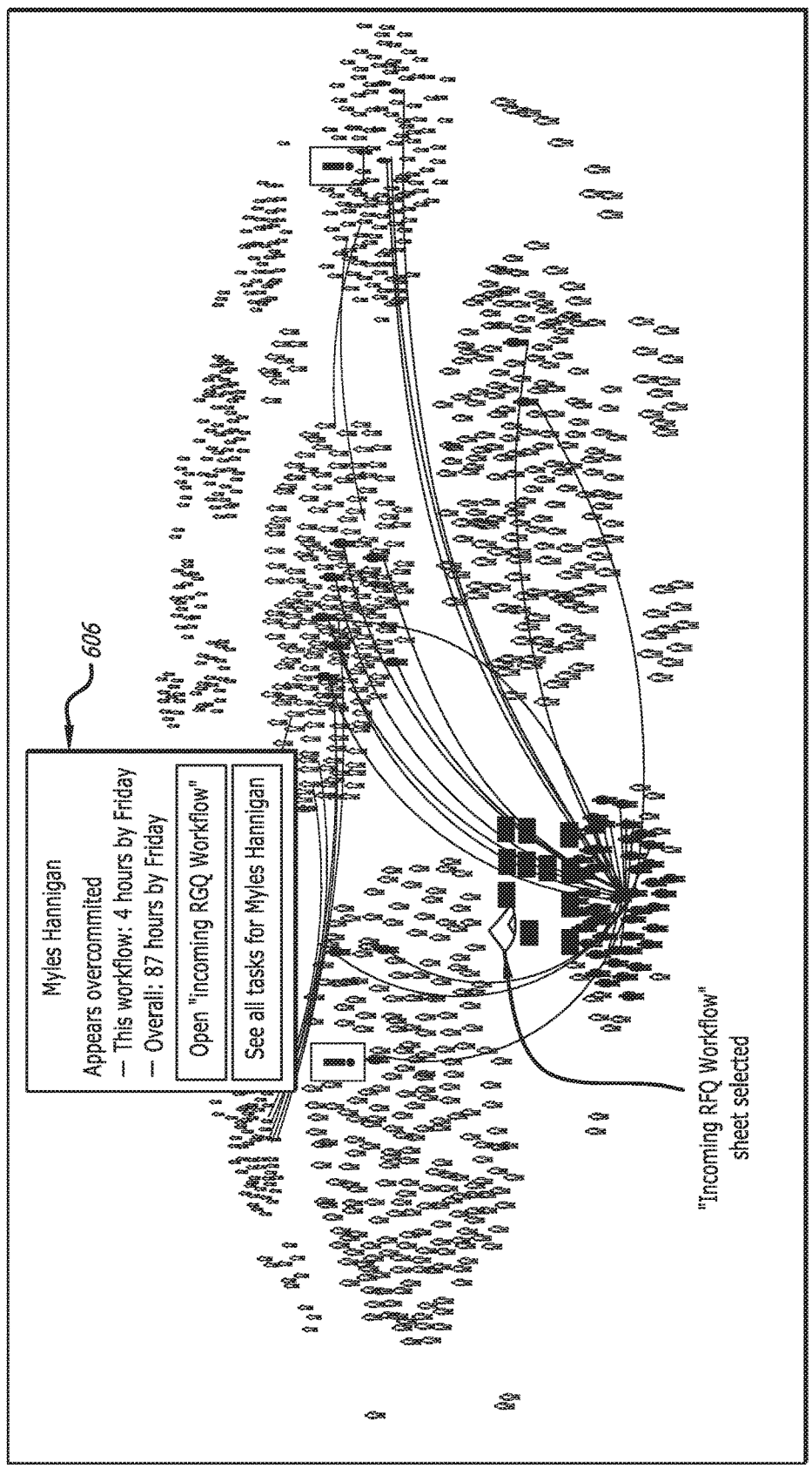

FIGS. 6A and 6B illustrate another exemplary embodiment of a visualization of a collaboration graph generated by the visualization generation engine 224. FIG. 6A shows a visualization with a particular sheet (titled "Incoming RFQ Workflow") selected. Two of the users associated with that sheet are flagged with a red exclamation point 602, 604 indicating that they may have resource constraint issues. In some embodiments, the resource constraint issues may be detected by considering other sheets for which it is indicated in the sheet metadata that the user is assigned tasks, by adding an expected work for each of the tasks assigned to the user, and comparing the expected work to a threshold amount of work (such as a number of work hours available before the due dates of the tasks). As illustrated, the collaboration system 102 has determined that these two users have more than the threshold amount of work assigned to them.

The user inspecting the visualization wants to learn more and potentially address the issues, so she clicks on the exclamation point 602. The visualization then transitions to FIG. 6B. She then is presented more information 606 about both costs arising from the current sheet and the sum of everything else assigned to the user. She can take action by clicking on one or the other of the blue buttons. The first simply opens the selected sheet so that it may be inspected for efficiencies. The second button opens a report created on the fly based on the collaboration graph showing all of the tasks assigned to the user across all of the sheets he is involved in. She can use that report to update assignments directly in the report or drill into the sheets and make changes there if she has the right permissions, or if she doesn't have permissions to edit herself, she can figure out who to talk to in order to address the problem.

Figure 7A:
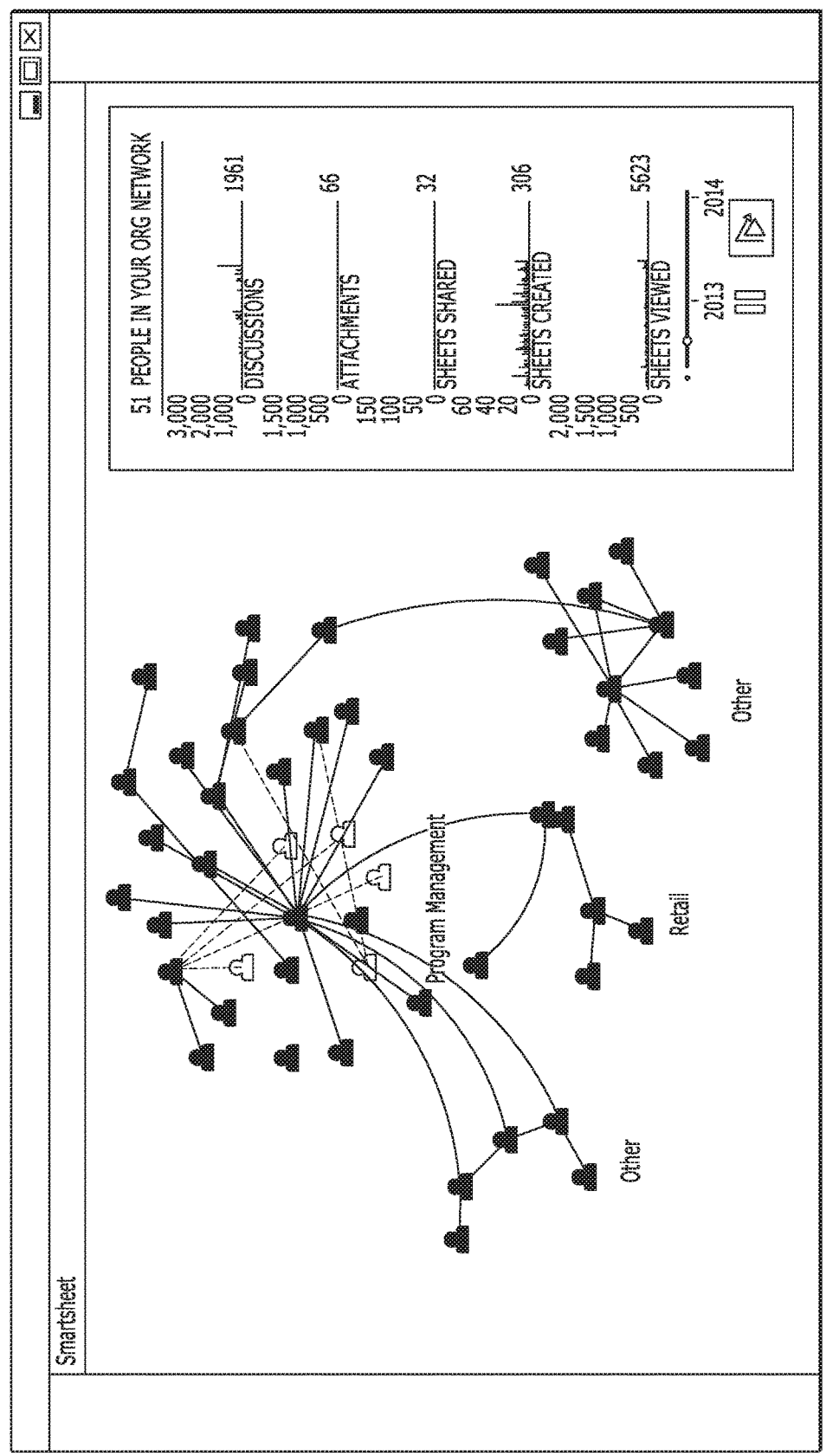
FIGS. 7A-7C illustrate an exemplary embodiment of a timeline visualization generated by the collaboration system.
Figure 7B:
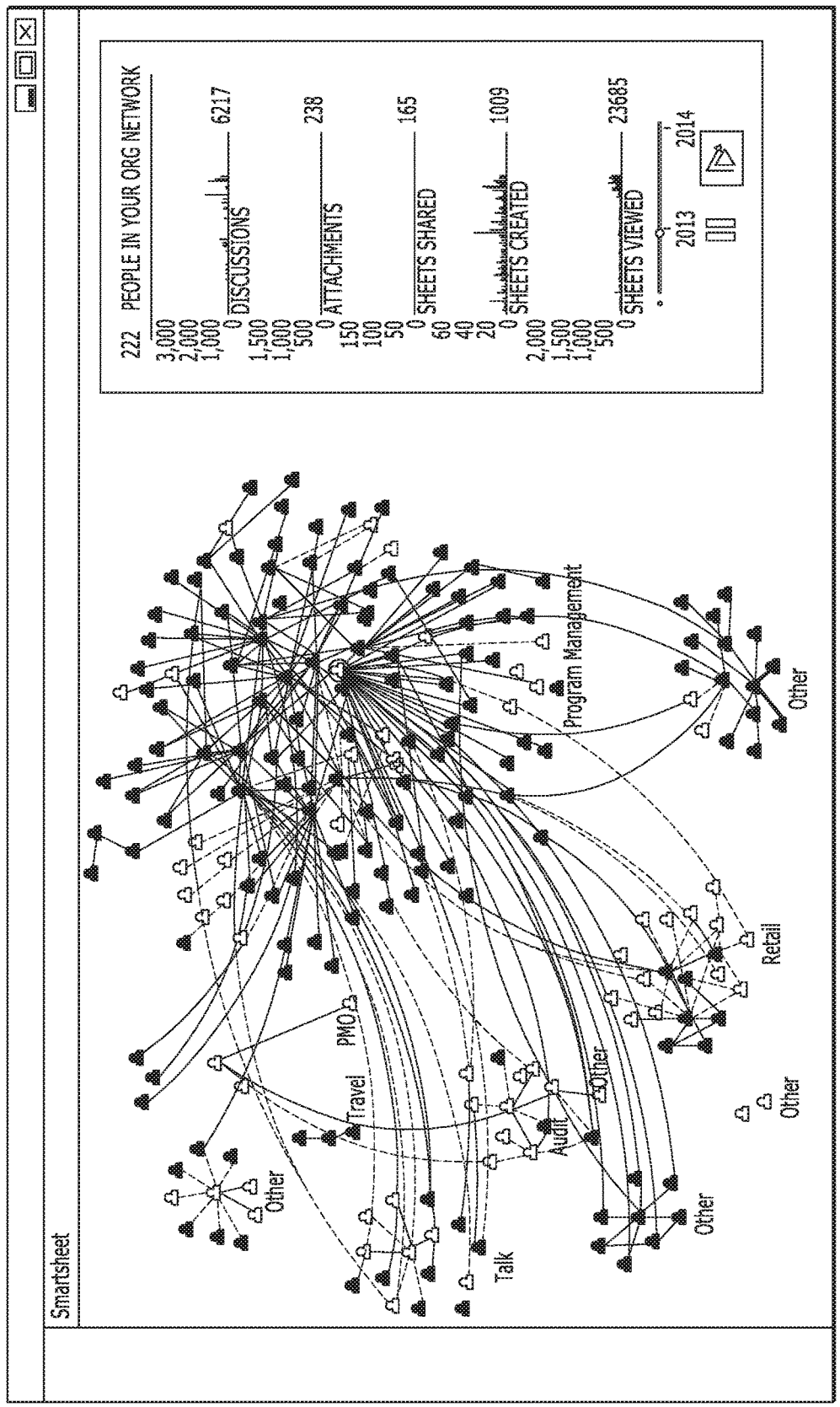
Figure 7C:
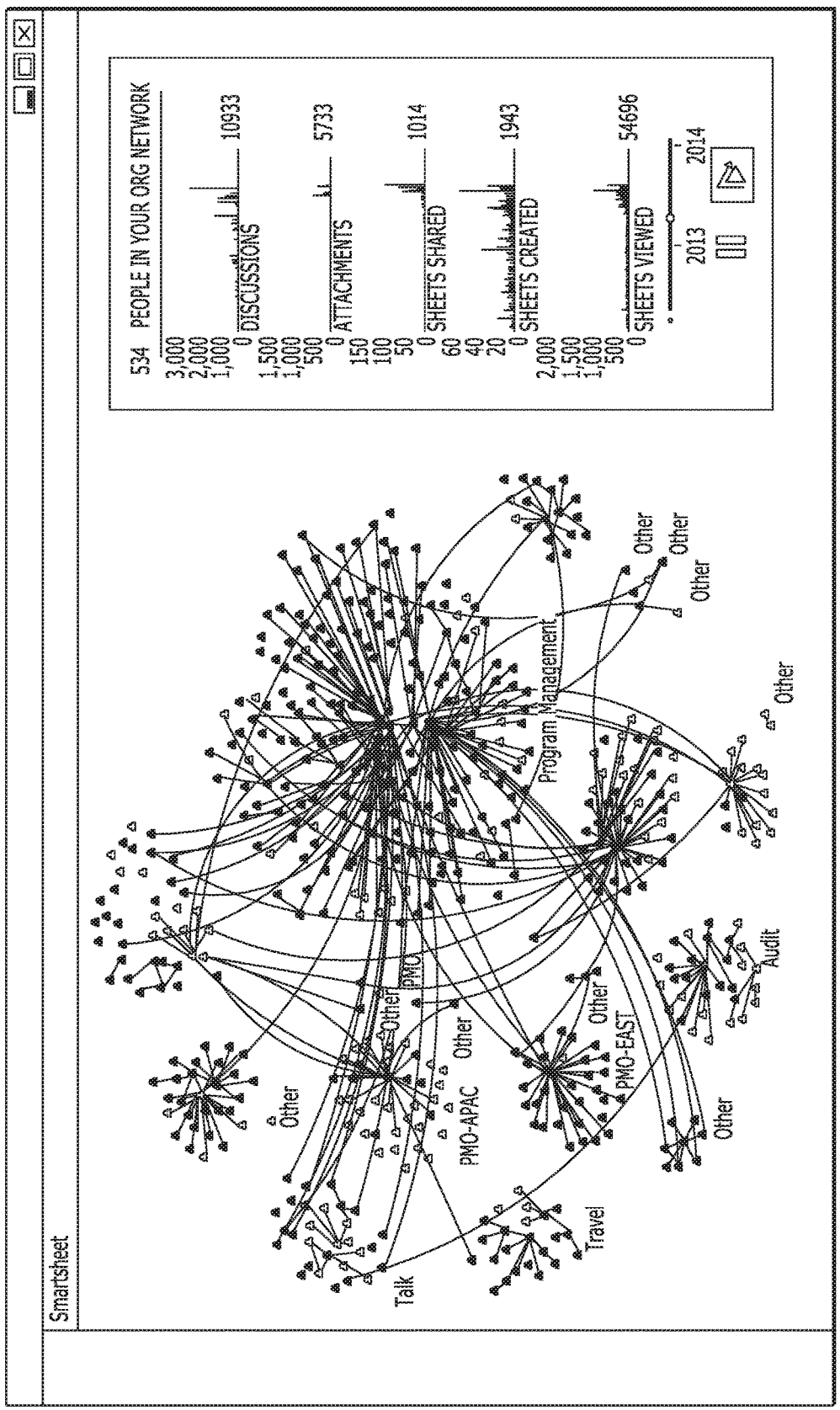

FIGS. 7A-7C illustrate an exemplary embodiment of a timeline visualization generated by the collaboration system 102. In FIG. 7A, an initial visualization is presented that is based on a collaboration graph generated shortly after the collaboration system 102 was adopted. FIG. 7B shows an intermediate state where usage has grown within the organization, wherein the visualization is based on a newly generated collaboration graph. FIG. 7C shows a later state where even more groups across the entity have started using the collaboration system 102 and the collaboration graph has been updated again. The division of vertices in the collaboration graph into groups allow these visualizations to show that not only is the collaboration system 102 being used more over time, but also that it is being adopted by more teams across the enterprise, in some embodiments, the visualizations in FIGS. 7A-7C would be animated in order to morph from one visualization to the next and show the growth of adoption in a dynamic manner.

Figure 8:
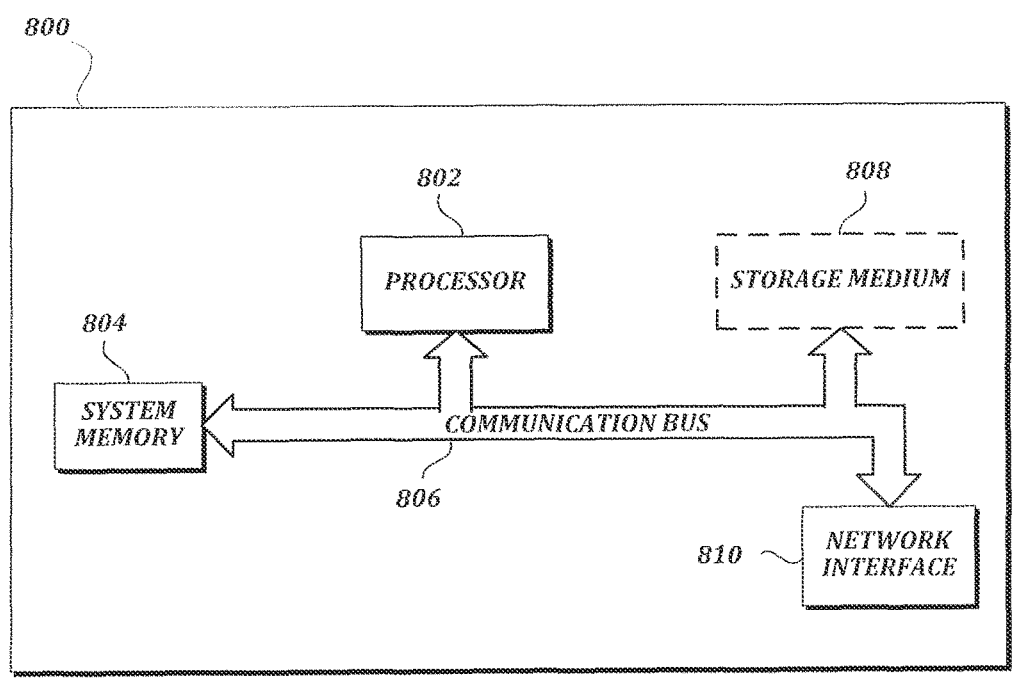
FIG. 8 is a block diagram that illustrates aspects of an exemplary computing device 800 appropriate for use with embodiments of the present disclosure.

FIG. 8 is a block diagram that illustrates aspects of an exemplary computing device 800 appropriate for use with embodiments of the present disclosure. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media. Computer-readable media can be used to store data for use by programs. Accordingly, the terms "electronic spreadsheet," "grid," "table," "cell," "spreadsheet data," "sheet data," "column entry," "row entry," and others used herein describe display formats and logical inter-relationships for information stored on a computer-readable medium of a computing device 800.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Computer interfaces may be included that allow users and/or other software processes to input conditions and/or rules, and/or to inspect, modify, test, customize, re-order, or prioritize one or more rules or processes used by embodiments of the present disclosure. Further, these FIGURES may graphically represent code to be programmed into a computer-readable storage medium associated with a computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for managing online documents, the system comprising:
    a sheet data store configured to store a plurality of sheets, wherein each sheet includes a set of rows, and wherein each row includes a set of columns;
    an interaction monitoring engine configured to monitor interactions by users with the plurality of sheets;
    an interaction data store configured to store records of the interactions monitored by the interaction monitoring engine;
    a sheet metadata data store configured to store sheet metadata representing relationships between sheets of the plurality of sheets;
    a collaboration graph generation engine configured to generate a collaboration graph that represents relationships between the sheets and the users based on the interaction records and the sheet metadata;
    a collaboration graph analysis engine configured to analyze vertices the collaboration graph for similarities;
    a visualization generation engine configured to generate one or more visualizations of collaboration graphs generated by the collaboration graph generation engine; and
    a collaboration graph data store configured to store a plurality of collaboration graph versions generated over time;
    wherein the visualizations include an animation that shows changes in the collaboration graph versions over time.

2. The system of claim 1, further comprising a user data store configured to store a plurality of user records identifying the users of the system.

3. The system of claim 1, wherein the visualizations include a two-tier visualization that includes:
    a first level that comprises a plurality of sheet icons; and
    a second level that comprises a plurality of user icons.

4. The system of claim 3, wherein the sheet icons are spatially arranged in the first level according to calculated similarity values.

5. The system of claim 3, wherein the user icons are spatially arranged in the second level according to calculated similarity values.

6. The system of claim 3, wherein the two-tier visualization further includes one or more connections between the sheet icons in the first level and the user icons in the second level to indicate interactions by the users related to the sheets.

7. The system of claim 1, wherein the visualization generation engine is configured to:
   determine, based on the collaboration graph, that a user is over-utilized; and
   insert an icon into a visualization that indicates the over-utilized user.

8. The system of claim 7, wherein determining that a user is over-utilized includes:
   counting a length of time of all tasks assigned to the user; and
   determining that the length of time is greater than a threshold amount.

9. The system of claim 1, further comprising:
   a front-end interface engine configured to provide a set of user interfaces to the sheets; wherein the set of user interfaces includes one or more of:
   a sheet management interface; and
   an email sharing interface.

10. The system of claim 9, further comprising a plurality of computing devices configured to access the set of user interfaces provided by the front-end interface engine, wherein the plurality of computing devices include one or more of a desktop computing device, a smartphone computing device, a tablet computing device, and a laptop computing device.

11. The system of claim 1, wherein the interactions include one or more of a view, an edit, and a share.

12. A method of automatically provisioning new sheets in a collaboration system to match existing sheets, the method comprising:
   collecting, by a computing device, interaction information representing interactions between a plurality of users and a plurality of sheets stored in a sheet data store;
   generating, by a computing device, a collaboration graph that represents relationships between the sheets and the users;
   calculating, by a computing device, similarities between the sheets based in part on the relationships between the sheets and the users;
   determining, by a computing device, one or more discrepancies within sheets determined to be similar; and
   updating, by a computing device, the sheets determined to be similar to eliminate the discrepancies.

13. The method of claim 12, wherein calculating similarities between the sheets includes analyzing sheet metadata information that indicates relationships between the sheets along with the interaction information using a clustering algorithm.

14. The method of claim 13, wherein the collaboration graph includes:
   a plurality of user vertices that represent users;
   a plurality of sheet vertices that represent sheets; and
   a plurality of edges; wherein each edge connects a user vertex to a sheet vertex, and wherein each edge represents an interaction.

15. A method of generating a visualization of collaboratively edited data, the method comprising:
   collecting, by a computing device, interaction information representing interactions between a plurality of users and a plurality of sheets;
   generating, by a computing device, a collaboration graph that represents relationships between the sheets and the users;
   updating, by a computing device, the collaboration graph with information regarding similarities between vertices; and
   generating, by a computing device, a visualization based on the updated collaboration graph that illustrates relationships between sheets and relationships between users.

16. The method of claim 15, wherein generating the visualization includes:
   presenting a set of sheet icons representing the plurality of sheets, wherein the set of sheet icons are arranged according to similarity groups.

17. The method of claim 16, wherein generating the visualization further includes presenting at least one connection from a user icon to one or more sheet icons to represent interactions between the user and the sheets.

18. The method of claim 15, wherein the visualization is a first visualization, and wherein the method further comprises:
   collecting further interaction information representing interactions between the plurality of users and the plurality of sheets since the generation of the collaboration graph;
   generating an updated collaboration graph that represents relationships between the sheets and the users as updated by the further interaction information;
   generating a second visualization based on the updated collaboration graph; and
   generating an animation that illustrates the first visualization turning into the second visualization.

* * * * *